United States Patent [19]
Rentschler et al.

[11] 3,988,754
[45] Oct. 26, 1976

[54] FAST OPERATING SLIT SHUTTER CAMERA

[75] Inventors: Waldemar T. Rentschler; Franz W. R. Starp, both of Calmbach, Germany

[73] Assignee: Prontor-Werk, Alfred Gauthier GmbH, Wildbad, Germany

[22] Filed: May 28, 1975

[21] Appl. No.: 581,530

Related U.S. Application Data

[63] Continuation of Ser. No. 417,909, Nov. 21, 1973, abandoned.

[52] U.S. Cl. .............................. 354/246; 354/248; 354/249
[51] Int. Cl.² .................... G03B 9/36; G03B 9/20
[58] Field of Search ........... 354/245, 246, 247, 248, 354/249

[56] References Cited
UNITED STATES PATENTS

| | | | |
|---|---|---|---|
| 2,927,519 | 3/1960 | Matsuda | 354/246 |
| 3,078,776 | 2/1963 | Okabe | 354/246 |
| 3,672,282 | 6/1972 | Yamada | 354/246 |
| 3,829,878 | 8/1974 | Onda et al. | 354/246 |
| 3,903,539 | 9/1975 | Kitai et al. | 354/246 |

*Primary Examiner*—Russell E. Adams, Jr.
*Attorney, Agent, or Firm*—Arthur A. March

[57] ABSTRACT

This invention is directed to a photographic camera having a slit shutter which utilizes two cover systems which operate above the plane of the image. These systems are movable perpendicularly to the direction of movement of the film within the camera. Each cover system comprises displaceable segments movable relative to each other. These can be brought into and out of overlapping position at a corresponding opposed end of the image window. When open, they extend across the window to cover the window, and when closed they recede into overlapping position to uncover the window. While broadly speaking, the so-called "slit shutter" type of shutter has been used, the herein described proposal for providing the open and closed systems is unique. This invention provides multiple segments which are movable relative to each other in which the corresponding slit-forming segment of each cover system is guidingly supported for displacement by link means and at least two cover segments are associated with each slit-forming segment and correspondingly guidingly supported for displacement by straight guide means, preferably so that each of the slit-forming segments and the cover segments associated therewith are connected directly to form a generally parallelogram link formation for common drive.

5 Claims, 5 Drawing Figures

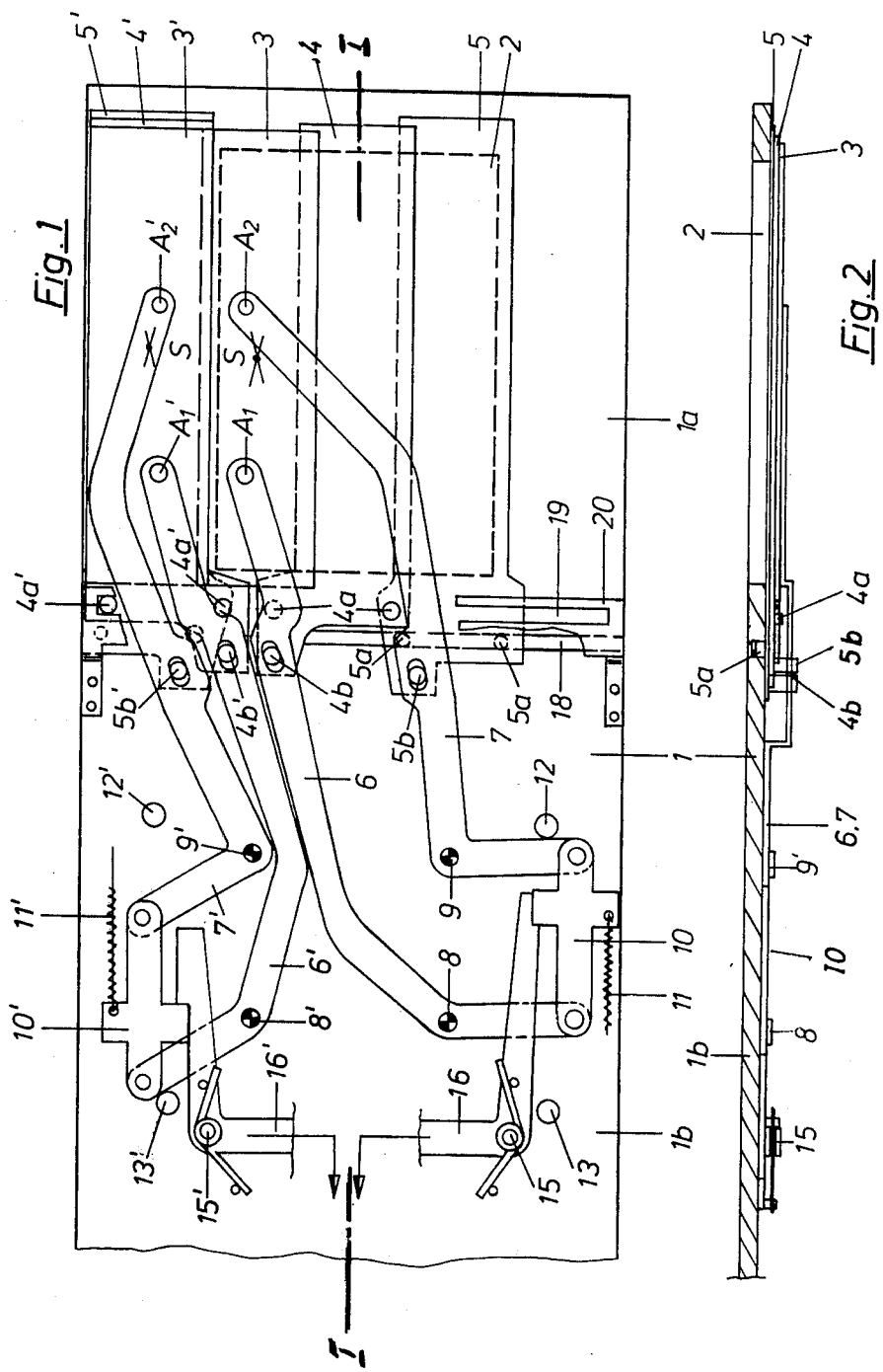

FAST OPERATING SLIT SHUTTER CAMERA

This is a continuation of application Ser. No. 417,909 filed on Nov. 21, 1973, now abandoned.

BACKGROUND OF THE INVENTION

The present invention concerns a slit shutter for a camera comprising two cover systems operating above the plane of the image and perpendicularly to the direction of movement of the film, each of which systems comprises segments which are displaceable relatively to each other and can be brought out of an overlapping position at one edge of the image window into an extended position across the said window, both cover systems cooperating in such a manner that when one cover system moves into the overlapping position of the segments it is followed by the other system which opens out after a perdetermined time.

A slit shutter of the above type is already known, in which the opening and closing systems uncovering and covering the image window consist in each case of a set of three segments. Two of the segments of the particular set of segments, i.e. the slit-forming segment and one of the cover segments, are connected directly to parallelogram links, whereas the other cover segment located between these two segments is brought into contact with the links only by means of additional lever-type guide members. Apart from the fact that these guide members serving for the suspension of the center segment, limit the division of a set of segments to a maximum of three, this arrangement necessitates a width of the image window frame in the region into which the segments swing in the overlapping position, which is greater than that necessary to accommodate the individual segments. The consequence is an increase in the overall depth of the shutter assembly which militates against the fitting of a slit shutter in small or compact cameras in which tight limits are set with regard to depth measurements.

The above-mentioned incorporation of additional guide members also affects the operation of the shutter, since relatively large masses have to be accelerated during exposure. The consequence of this is that short exposure times (e.g. of the order of 1/125th sec) cannot be achieved with a slit width corresponding to the full width of the image window, as is required particularly when photographing by electronic flash, due to insufficient acceleration of the slit-forming segment. This cannot be cured by increasing the driving force for the shutter members, since upper limits are set to such driving forces to protect the shutter members from overstressing and damage.

The object of the present invention is the provision of a slit shutter which is characterised by the lowest possible depth and by such a high acceleration of the segments taking part in the formation of the edges of the slit, that suitable short exposure times with a completely exposed image window are achievable thereby for carrying out flash-light photographs by electronic flash devices.

According to the present invention there is therefore provided a slit shutter for a camera, comprising two cover systems operating above the plane of the image and moving perpendicularly to the direction of movement of the camera film, each of said systems comprising relatively displaceable segments which can be moved out of an overlapping position at one edge of the image window into an extended position across said image window, both cover systems co-operating in such manner that when one cover system moves into the overlapping position of the segments, it is followed by the other system which opens out after a predetermined time, the segment of the particular cover system forming the exposure slit being supported by links, and at least two cover segments being associated with this segment which are supported by straight guides.

In this manner, it has been possible to obtain such a reduction in the depth of the shutter that such shutters are suitable for fitting in cameras the depth of which must not exceed a certain limit. For the first time, it has been possible to fulfil this requirement in a slit shutter, because the image window frame need not be much wider than the width of the segment itself in the space into which the segments swing for exposing the image window, since, in the shutter arrangement of the present invention, no additional guide members necessitating widening of the frame are required. If the number of cover segments is increased to three or even four segments, for which purpose the invention provides adequate guiding means, it is possible to obtain such a reduced shutter depth as to allow for even the extreme requirements demanded by miniature camera manufacturers.

Due to the reduction, obtained by the omission of unnecessary guide members, of the masses to be accelerated during the short period of illumination of the electron flash, the entire image window is uncovered. The time interval of the full opening of the shutter must be at least as long for electronic flash photographs as the time for which illumination by the electronic flash lasts. Since the shutter of the present invention also fulfills this condition in that the slit-forming segments can be driven with high acceleration, all the effects which have previously had an unfavourable influence in known slit shutters on the result of electronic flashlight photographs have been completely eliminated.

The best kinematic movement ratios have been obtained by the present invention in that a pair of links forms a parallel linkage, both links being driven in the same direction and at the same speed, their engagement with the slit-forming segment taking place at points which lie relatively to the movement direction of the segment, to right and left of its center of gravity. This arrangement ensures a drive of the slit-forming segment which is free of tilting and twisting movements and provides high acceleration while at the same time avoiding high stresses in the shutter members. The two links of a parallel linkage are formed as double-arm angled levers mounted to rotate about a position in the region of the bend, the links being pivotably connected together at one end by a coupling.

According to a further feature of the present invention, the cover segments associated with a slit-forming segment are connected in driving engagement with the links of the parallel linkage and the lever ratios are such that the spacing of the points driving engagement with the respective slit-forming segment and the cover segments associated therewith, corresponds to the travel which each of the segments effects during the exposure. This feature provides a relatively simple construction for a slit shutter manufactured according to the present invention. If certain features of camera design raised by the camera manufacturer are to be taken into consideration, the cover segments associated with a slit-forming segment may be provided with a separate drive, the driving members being jointly tensioned and released, while the driving speed for each segment is adapted to the movement to be effected thereby.

The invention is described hereinafter in greater detail with reference to an embodiment of a slit shutter, the particular opening and closing system including a slit-forming segment and two cover segments respectively and illustrated in the accompanying drawings.

BRIEF DESCRIPTION OF THE DRAWINGS

FIG. 1 shows a plan view of the slit shutter with the opening and closing systems in the basic position covering the image window;

FIG. 2 shows a section taken on the line I—I of FIG. 1;

DETAILED DESCRIPTION OF THE PREFERRED EMBODIMENTS

Figure 3:
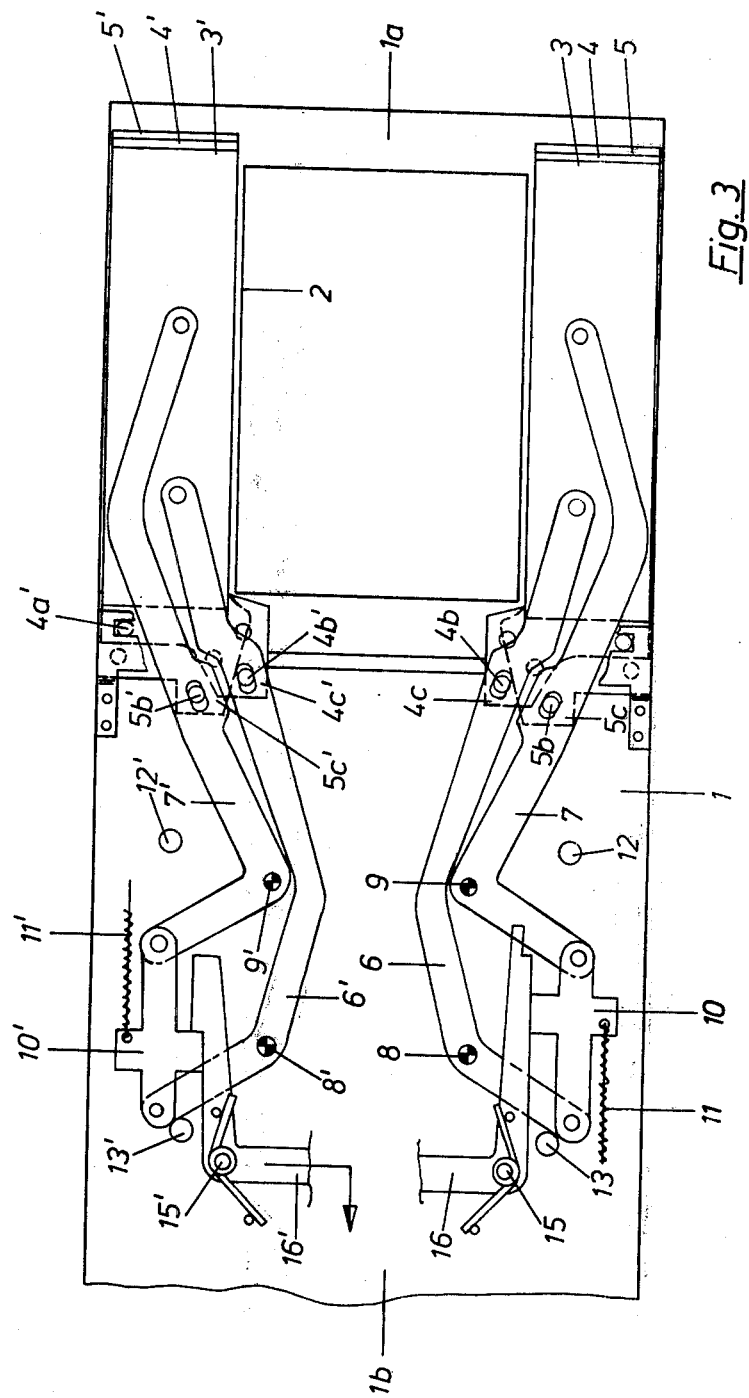
FIG. 3 shows the slit shutter in the open position, the opening system exposing the image window and the closing system not yet having left the basic position.

In the drawings a base plate serving to mount displaceable parts of the slit shutter is indicated by 1. This base plate is provided with a portion 1a in which there is a picture window 2, and also another portion 1b on which there are guiding and driving members of an opening and closing system respectively, for temporarily opening and covering the image window. The parts are mirror-symmetrical, and are mounted to rotate about fixed pivots. In the embodiment shown in the drawings, these two systems are formed from a slit-forming segment 3 and 3' and two other cover segments 4 and 5 and 4' and 5' respectively having supplementary functions. The segments of each system enable a full slit width corresponding to the width of the image window to be used for the purpose of achieving the shortest possible exposure times, particularly in carrying out flashlight photographs with the use of an electronic flash, since during the time of illumination (approximately 1/25th sec) of this flash, this full slit width is essential.

The slit-forming segments 3 and 3' are carried and moved by the links 6 and 7 and 6' and 7' of a parallel linkage. The arrangement of the double-armed links 6 and 7 and 6' and 7', which pivot about fixed pins 8 and 9 and 8' and 9' respectively, is such that the segments 3 and 3' move along paths which are substantially straight lines, during rotation of the links. In order to effect a transmission of driving force, as free as possible from tilting moments, to the segments 3 and 3' they are connected to the links so that the pivot points $A_1 - A_2$ and $A_{1'} - A_{2'}$ are located left and right of the center of gravity S of the segments. At the other end the links 6 and 7 and 6' and 7' are articulated together by means of couplings 10 and 10'. Operating g force means 11 and 11', indicated in the drawings as springs act on the respective coupling in such manner that each spring exerts a clockwise torque on each of the parallel guides with respect to their bearing points 8 and 9 and 8' and 9'. In order to limit the particular range of movement of the parallel guides, fixed pins 12 and 13 and 12' and 13' are provided.

Figure 4:
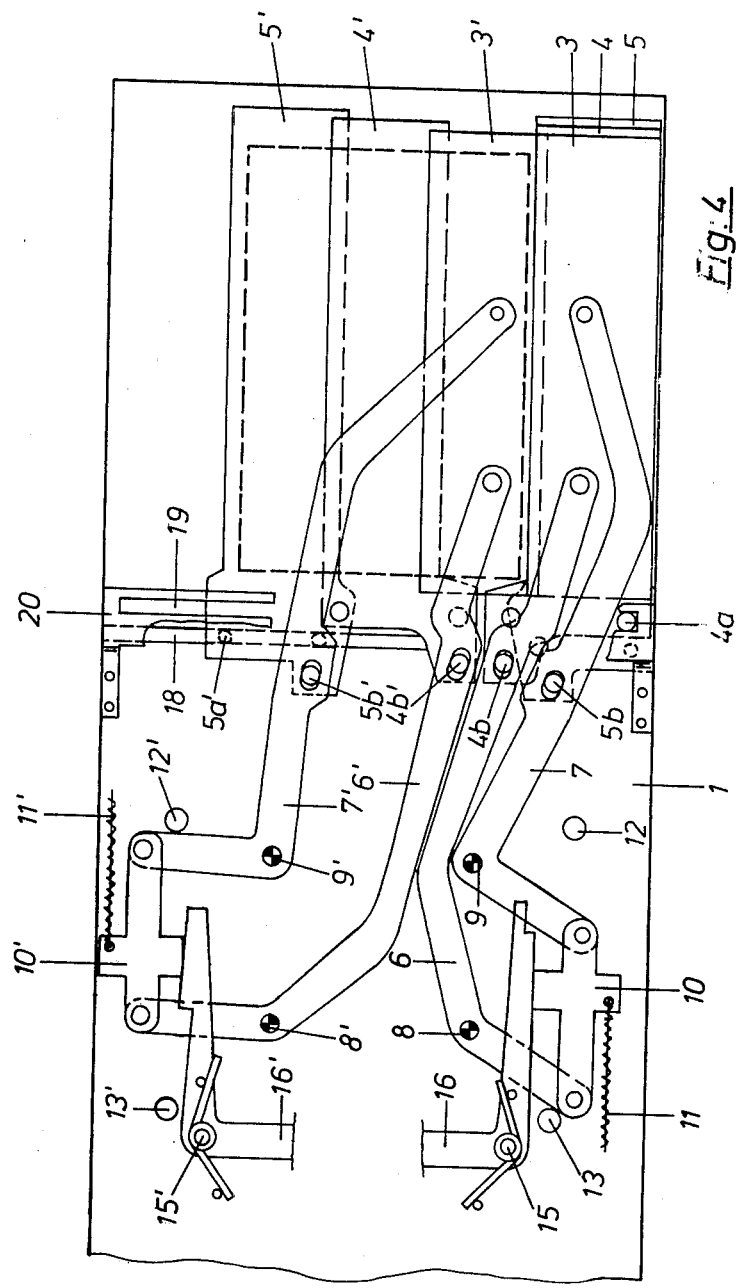
FIG. 4 shows the slit shutter in the closed position, the closing system having covered the image window again and, finally.

A double armed locking and detent pawl 16 and 16' subjected to spring bias and mounted on pins 15 and 15', engages the couplings 10 and 10'. This pawl is so designed that it can lock the couplings 10 - 10' against movement by their springs 11 and 11', and thus maintains the opening and closing system in the basic position assumed before each exposure. The slit forming segments 3 and 3', as described above, are suspended from links 6 - 7 and 6' 7' respectively and move just above the base plate 1, straight guides being provided for the other cover segments 4 - 5 and 4' - 5' respectively, associated with the segments 3 - 3'. These straight guides are shown as slots 18 and 19. The slot 18 is formed in the base plate itself, and the slot 19, as shown particularly in FIG. 4, is formed in a strip plate 20 secured by means of rivets to the base plate 1. Two pins 4a and 5a and 4a' and 5a' secured to the respective segment, slide in the slots 18 - 19, each of which serves to guide one of the cover segments 4 - 5 and 4' - 5' respectively of the opening and closing system. The pins 5a - 5a' provided on the respective cover segments 5 - 5' engage in the slot 18 and the pins 4a - 4a' provided on the cover segments 4 - 4' engage in the slot 19 extending parallel to the slot 18. Since the cover segments 4 and 5 and 4' - 5' respectively move between two plates, i.e. the base plate 1 and a plate 20 located thereon with a small space between them, and having the guide slots 18 - 19, the guide pins 4a - 4a' extend downwardly with respect to the plane of movement of the cover segments 4 - 5 and 4' - 5', as shown in particular from FIG. 5 and the guide pins 4a-5a' extend upwardly.

Figure 5:
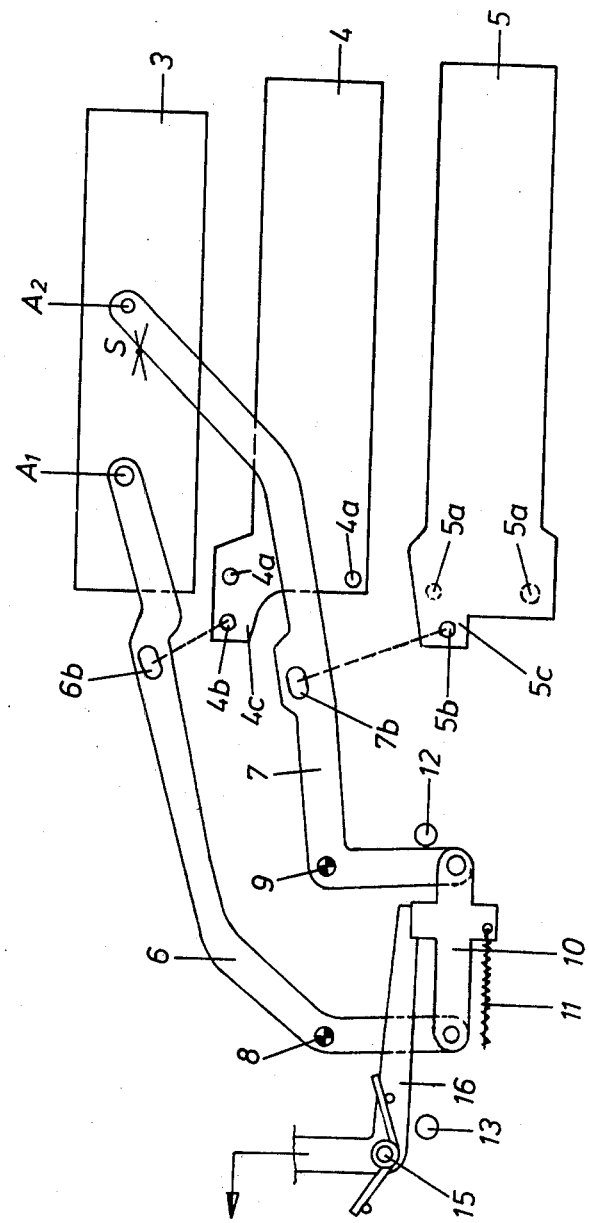
FIG. 5 shows the closing system in a view in which the cover segments connected to the links of the parallel guide itself, are shown removed to one side for greater clarity, and their driving engagement with the respective link is indicated by a broken connecting line.

As shown in FIG. 5, the cover segments 4 - 5 of the opening system, and similarly, the cover segments 4' - 5' of the closing system, as shown in FIGS. 1 and 3, are brought by means of pin and slot connections 4b - 6b and 5b - 7b, or 4b' - 6b' and 5b' - 7b', into driving engagement with the links 6 and 7 and 6' and 7' respectively so that they are driven over a path through which the link ends move during a reciprocating movement. In this case each of the two segments 4 and 5 or 4' and 5', as shown more particularly in FIGS. 3 and 5, is provided with an extension 4c - 5c, 4c' -5c', on which there are pins 4b - 5b, 4b' -5b' serving to couple the segments with their respective links.

In order to drive the cover segments 4 - 5 or 4' -5', separate drives could be provided instead of a direct driving engagement between a segment and link 6 - 7 and 6' - 7', in such manner that each of the segments 4 - 5 and 4' - 5' is driven by a cam, lever, toothed segment, cable or the like at the necessary speed. Such drives, are known in shutter design and therefore are not described here.

In the above-described embodiment, both the opening system and the closing system comprise not only the particular slot-forming segments 3 - 3', but also two cover segments 4 - 5 and 4' - 5'. If it is required to produce a slit shutter with extremely low depth, the number of cover segments could be increased from 2 to 3 or even 4, since by raising the total number of cover segments of each cover system, a corresponding reduction in the width of the individual segments is possible. Accordingly, the space into which the segment systems swing in fanning together can be made narrower than is possible in a shutter arrangement having only two such cover segments.

In FIG. 3, the pawl 16 has been actuated to operate the opening system 3, 4, 5 and hence uncover the image window 2 for the purpose of exposing the film material behind it. This movement is always followed by actuation of the closing system 3', 4', 5' after a certain delay. For this purpose the release such manner that this device effects the release of the closing system 3', 4', 5' by actuation of the pawl 16' after a certain time from the beginning of the operation of the opening system. As soon as pawl 16' is disengaged from the locking position, as shown in FIG. 4, the closing system 3', 4' 5' comes into action and covers the image window 2 which has been uncovered by the opening system 3, 4, 5.

A resetting device (not shown) may be provided to drive the closing system 3', 4', 5' and synchronously therewith, the opening system 3, 4, 5 back into the position shown in FIG. 1, the segments of the opening system meanwhile changing over from the overlapping condition into the extended or fanned-out position.

When the links 6 - 7 and 6' - 7' carrying the slit-forming plates 3 - 3' have again reached the basic position shown in FIG. 1, the locking and release pawls 16 and 16' drop behind the catches provided on the couplings 10 and 10' respectively, so that the opening and closing systems are locked in the basic position, ready for the next exposure.

What is claimed is:

1. Slit shutter structure for a camera, comprising a shutter frame provided with an image window having a pair of opposed edges, a corresponding pair of opposed slit-shutter cover systems operating above the plane of the image window, each said system comprising relatively displaceable segments including a slit-forming segment forming the corresponding exposure slit edge and at least two cover segments associated therewith, said segments of each system being sequentially movable out of an overlapping position at a corresponding said opposed edge of the image window into an extended position across the image window, to shut said window, both said cover systems cooperating in such manner for movement during shutter operation that when one said cover system is moved into the overlapping position of its segments for shutter opening, the other cover system is moved in turn after a predetermined exposure time interval into the extended position of its segments for shutter closing, links on the shutter frame guidingly supporting the slit-forming segment of each cover system for movement of such slit-forming segment between such positions, and straight guides on the shutter frame guidingly supporting the cover segments associated with each said slit-forming segment for corresponding movement of such at least two cover segments between such positions.

2. Slit-shutter structure according to claim 1 wherein the links supporting each said slit-forming segment are connected to form a parallel linkage in which the sides of the links are drivable operatively in the same direction and at the same speed, and said links are pivotably connected to the corresponding slit-forming segment to pivot about a pair of corresponding spaced apart points located on the corresponding slit-forming segment to the right and left of the center of gravity of such slit-forming segment with respect to the direction of movement of such slit-forming segment.

3. Slit-shutter structure according to claim 2, wherein the parallel linkage comprises a parallel guide formed of two links constituting adjacent double-armed angled levers, each lever having a pair of opposed arms extending from an angle apex portion, said levers being pivoted in the vicinity of the corresponding apex portion to said shutter frame, and coupling means are operatively provided between an arm of one of the levers and an adjacent corresponding arm of the other of the levers to interconnect said levers operatively thereat.

4. Slit-shutter structure according to claim 3 wherein the cover segments associated with the slit-forming segment of each cover system are connected in drivable engagement with the double-armed angled levers of the corresponding parallel linkage for such cover system, operatively to provide with respect to such slit-forming segment and such cover segments lever ratios which determine the path which each of the segments travels during shutter operation.

5. Slit-shutter structure according to claim 4 wherein drive means are provided respectively to drive the parallel linkage and in turn move the so-guidingly supported segments of each cover system for shutter operation.

* * * * *